United States Patent [19]
Inui et al.

[11] Patent Number: 5,103,951
[45] Date of Patent: Apr. 14, 1992

[54] OPERATION CONTROL SYSTEM FOR AUTOMOTIVE WORKING VEHICLES

[75] Inventors: Tsutomu Inui; Shigeru Osawa, both of Wako, Japan

[73] Assignee: Honda Giken Kogyo Kabushiki Kaisha, Tokyo, Japan

[21] Appl. No.: 759,471

[22] Filed: Sep. 13, 1991

[30] Foreign Application Priority Data

Sep. 20, 1990 [JP] Japan .............................. 2-98591[U]

[51] Int. Cl.⁵ .............................................. F16D 21/04
[52] U.S. Cl. .................................. 192/0.046; 180/53.1
[58] Field of Search ............... 192/0.042, 0.044, 0.045, 192/0.046, 0.062, 0.09, 0.092; 180/53.1, 53.6, 273

[56] References Cited

U.S. PATENT DOCUMENTS

| | | | |
|---|---|---|---|
| 3,999,643 | 12/1976 | Jones | 192/0.09 X |
| 4,116,296 | 9/1978 | Pleier | 180/273 |
| 4,509,614 | 4/1985 | Bando et al. | 180/273 |
| 4,651,018 | 3/1987 | Peterson, Jr. | 180/273 X |
| 4,699,561 | 10/1987 | Tee | 180/273 X |
| 4,711,333 | 12/1987 | Okamura | 192/0.09 X |

FOREIGN PATENT DOCUMENTS 1-155037  6/1989  Japan .

*Primary Examiner*—Leslie A. Braun
*Assistant Examiner*—Nicholas Whitelaw
*Attorney, Agent, or Firm*—Frishauf, Holtz, Goodman & Woodward

[57] ABSTRACT

An operation control system of an automotive working vehicle has a self-resetting switch as a switch for stationary operation and a self-holding circuit. The self-holding circuit is set by operating the self-resetting switch to a predetermined set state when the following predetermined conditions are satisfied: detection of a driver's seat being unoccupied, detection of a transmission being in neutral, and detection of a PTO shaft for stationary operation being selected. In the predetermined set state of the self-holding circuit, the engine of the automotive working vehicle can operate even when a PTO clutch is engaged, provided that the above predetermined conditions are satisfied. In another form of the invention, the predetermined conditions further include detection of a parking brake being locked.

2 Claims, 7 Drawing Sheets

FIG.7
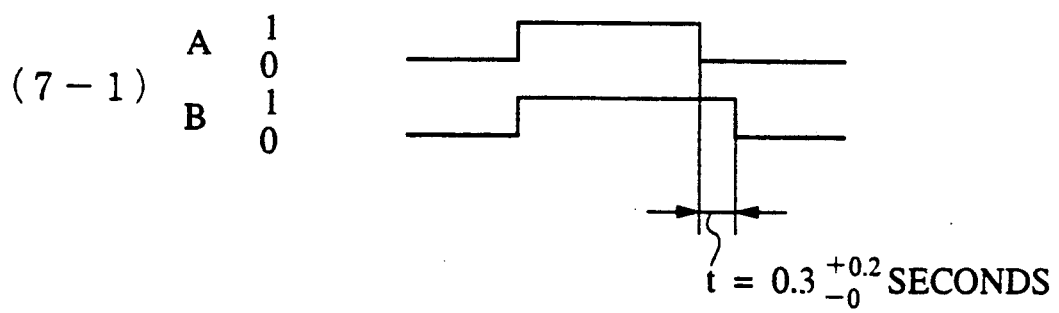
(7-1)
$t = 0.3 ^{+0.2}_{-0}$ SECONDS
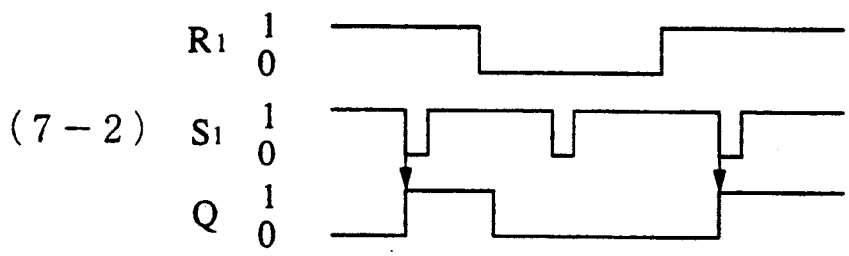
(7-2)
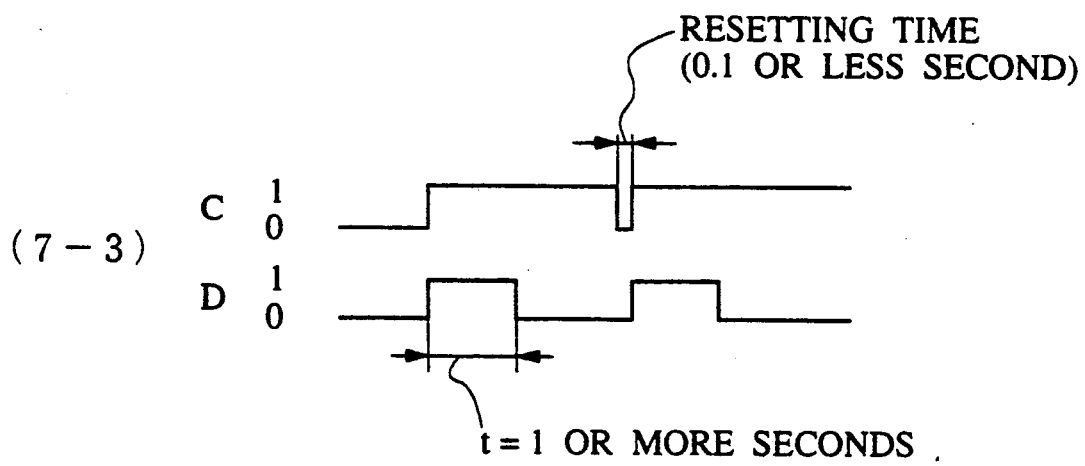
(7-3)
RESETTING TIME
(0.1 OR LESS SECOND)
$t = 1$ OR MORE SECONDS

OPERATION CONTROL SYSTEM FOR AUTOMOTIVE WORKING VEHICLES

BACKGROUND OF THE INVENTION

This invention relates to an operation control system for automotive working vehicles, and more particularly to an operation control system of this kind which enables the operation in a stationary state of working machines driven by PTO shafts of an automotive working vehicle to be performed reliably.

Conventionally, there has been proposed e.g. by Japanese Provisional Patent Publication (Kokai) No. 1-155037 an automotive working vehicle having working machines, such as a lawnmower and a rotary cultivator, mounted on PTO shafts thereof and driven by an engine installed on the vehicle through the PTO shafts.

According to this prior art, the automotive working vehicle has a plurality of PTO shafts to which a driving force is transmitted from the engine through a PTO clutch, and a control system which includes first detecting means for detecting whether or not an operator is seated on the driver's seat, second detecting means for detecting whether or not the transmission system of the vehicle is in a neutral position, third detecting means for detecting whether or not the parking brake is locked, fourth detecting means for detecting whether the PTO clutch is engaged or disengaged, and fifth detecting means for detecting whether or not a PTO shaft for stationary operation is selected out of the PTO shafts, the control system being operable to maintain the engine in operation when it is detected that the driver has left the driver's seat under at least the conditions that the PTO clutch is disengaged and at the same time the transmission system is in neutral position.

In such a conventional automotive working vehicle, a stationary operation is often performed by using the PTO shaft as a drive source e.g. for driving a water pump, while the operator is away from the vehicle. During such a stationary operation, if a person other than the operator improperly touches an operating device of the vehicle to operate the vehicle, e.g. if the person unlocks the parking brake, the engine automatically stops and hence the stationary operation is stopped. On this occasion, if the person relocks the parking brake or starts the starter motor, hurriedly and confusedly, to thereby immediately restart the engine rotating by inertia, the stationary operation is unpreferably restarted though the vehicle has moved from the original position for the stationary operation, possibly to a position unsuitable for the stationary operation, due to unlocking of the parking brake. A similar problem arises in a case where the transmission system of the vehicle has been shifted to a position other than the neutral position while the stationary operation is being performed.

Further, in this prior art, a switch for stationary operation is automatically reset when the driver's seat is occupied, which facilitates changeover from a stationary operation to a normal operation. However, to set the switch for stationary operation, it is necessary to carry out a special complicated operation to prevent the operator from failing to reset the switch, e.g. an operation of lifting the driver's seat so as for the driver to be unable to sit on the seat and setting the switch, which makes it difficult to operate the switch.

SUMMARY OF THE INVENTION

It is an object of the invention to provide an operation control system for an automotive working vehicle which enables to reliably resume a stationary operation which has been stopped due to stoppage of the engine caused by an operation which is not permitted to carry out, to satisfy conditions for carrying out a stationary operation, only when such conditions become satisfied.

It is a further object of the invention to provide an operation control system for an automotive working vehicle which facilitates operation of a switch for stationary operation while preventing the operator from failing to reset the switch.

To attain the above objects, according to a first aspect of the invention, there is provided an operation control system for an automotive working vehicle having an engine, a transmission, a plurality of PTO shafts including a PTO shaft for stationary operation, a PTO selector for selecting one of the plurality of PTO shafts, a PTO clutch which transmits, when it is engaged, a driving force from the engine to one of the plurality of PTO shafts selected by the PTO selector, and a driver's seat, the operation control system having first detecting means for detecting whether or not the driver's seat is occupied, second detecting means for detecting whether or not the transmission is in a neutral position, third detecting means for detecting whether or not the PTO clutch is engaged, fourth detecting means for detecting whether or not the PTO shaft for stationary operation has been selected out of the plurality of PTO shafts by the PTO selector, and engine operation-holding means for holding the engine in operation, when the first detecting means detects that the driver's seat becomes unoccupied at least under conditions that the third detecting means has detected that the PTO clutch is disengaged and the second detecting means has detected that the transmission is in the neutral position.

The operation control system according to the first aspect of the invention is characterized by comprising:

a self-resetting switch as a switch for stationary operation; and a self-holding circuit which is set, when the self-resetting switch is operated in a state where a first condition that the first detecting means has detected that the driver's seat is unoccupied, a second condition that the second detecting means has detected that the transmission is in the neutral position, and a third condition that the fourth detecting means has detected that the PTO shaft for stationary operation has been selected out of the plurality of PTO shafts by the PTO selector, are satisfied, to a predetermined set state which enables the engine to operate even when the third detecting means detects that the PTO clutch is engaged in the state where the first to third conditions are satisfied, the predetermined set state of the self-holding circuit being cancelled when at least one of the first to third conditions ceases to be satisfied.

According to a second aspect of the invention, the operation control system further includes fifth detecting means for detecting whether or not a parking brake is locked, and the self-holding circuit is set, when the self-resetting switch is operated in a state where the first condition that the first detecting means has detected that the driver's seat is unoccupied, the second condition that the second detecting means has detected that the transmission is in the neutral position, the third condition that the fourth detecting means has detected that the PTO shaft for stationary operation has been selected out of the plurality of PTO shafts by the PTO selector, and a fourth condition that the fifth detecting means has detected that the parking brake is locked, are satisfied, to a predetermined set state which enables the engine to operate even when the third detecting means detects that the PTO clutch is engaged in the state where the first to fourth conditions are satisfied, the predetermined set state of the self-holding circuit being cancelled when at least one of the first to fourth conditions ceases to be satisfied.

The above and other objects, features, and advantages of the invention will become more apparent from the ensuing detailed description taken in conjunction with the accompanying drawings.

BRIEF DESCRIPTION OF THE DRAWINGS

FIGS. 7 (7-1), (7-2), and (7-3) are timing charts for signals at different parts appearing in FIG. 6.

DETAILED DESCRIPTION

The invention will now be described in detail with reference to the drawings showing embodiments thereof.

Figure 1:
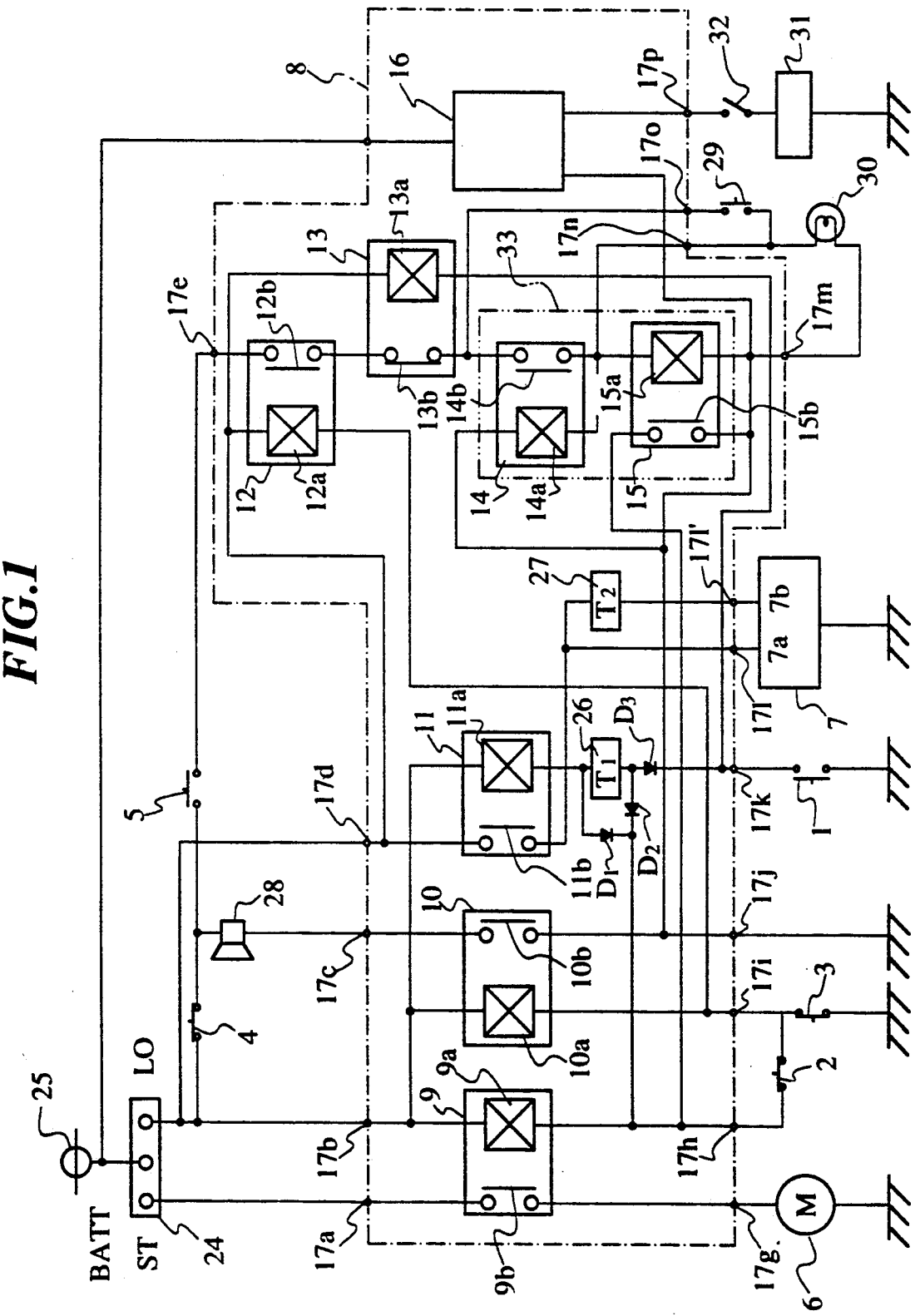
FIG. 1 is a circuit diagram showing an electric circuit of an operation control system for an automotive working vehicle according to an embodiment of the invention.

Referring first to FIG. 1, there is shown an electric circuit of an operation control system for an automotive working vehicle according to an embodiment of the invention;

As shown in the figure, the operation control system includes a seat switch (first detecting means) 1 for detecting whether or not the driver's seat is occupied, which is adapted to close when the driver's seat is occupied, a PTO clutch switch (third detecting means) 2 for detecting whether or not a PTO clutch 20 (FIG. 2) is engaged or disengaged, which is adapted to close when the PTO clutch 20 is disengaged, a neutral switch (second detecting means) 3 for detecting whether or not the shift lever of a transmission 22 (FIG. 2) is in a neutral position, which is adapted to close when the shift lever is in the neutral position, a parking brake switch (fifth detecting means) 4 for detecting whether or not a parking brake, not shown, is locked, which is adapted to close when the parking brake is locked, and a PTO selector switch (fourth detecting means) 5 for detecting whether or not a PTO shaft for stationary operation, i.e. a rear PTO shaft (RRPTO) is selected, which is adapted to close when the rear PTO shaft is selected.

Similarly to the aforementioned prior art system, this operation control system has a first function that if the operator leaves the driver's seat for some reason while a normal operation is being performed, i.e. while a working machine such as a lawnmower is being driven as the automotive working vehicle is moving, the seat switch 1 opens to automatically stop an engine 19 (FIG. 2), and a second function that if the operator leaves the driver's seat under a condition that both the PTO clutch switch 2 and the neutral switch 3 are closed, the engine 19 is held in operation.

Further, the operation control system has a self-resetting switch 29 as the switch for stationary operation, and a self-holding circuit 33 which continues to be in a set state for holding the engine in operation, even if the PTO clutch 20 is engaged to open the PTO clutch switch 20, after the self-resetting switch 29 is operated under the following condition: The driver's seat is not occupied, holding the engine 19 in operation by the second function, and at the same time the parking brake has been locked to open the parking brake switch 4 and the rear PTO shaft has been selected to close the PTO selector switch 5. The self-holding circuit 33 is constructed such that the set state thereof is cancelled by cancellation of any of a state in which the transmission system is in neutral position, a state in which the parking brake is locked, and a state in which the rear PTO is selected, or by the operator's sitting on the driver's seat.

The operation control system having the above functions includes a starter motor 6, and a stop solenoid 7 for stopping the engine 19. The stop solenoid 7 opens a passage for supplying fuel to the engine which is a diesel engine when energized and closes the passage when deenergized, whereby the operation or stoppage of the engine is selectively controlled.

Means for controlling the stop solenoid 7 etc. comprises, in the present embodiment, a combination relay system 8. The combination relay system 8 comprises a sequence control circuit having first to eighth relay circuits 9 to 16 for carrying out controls, described hereinafter, and terminals 17a to 17p.

Figure 2:
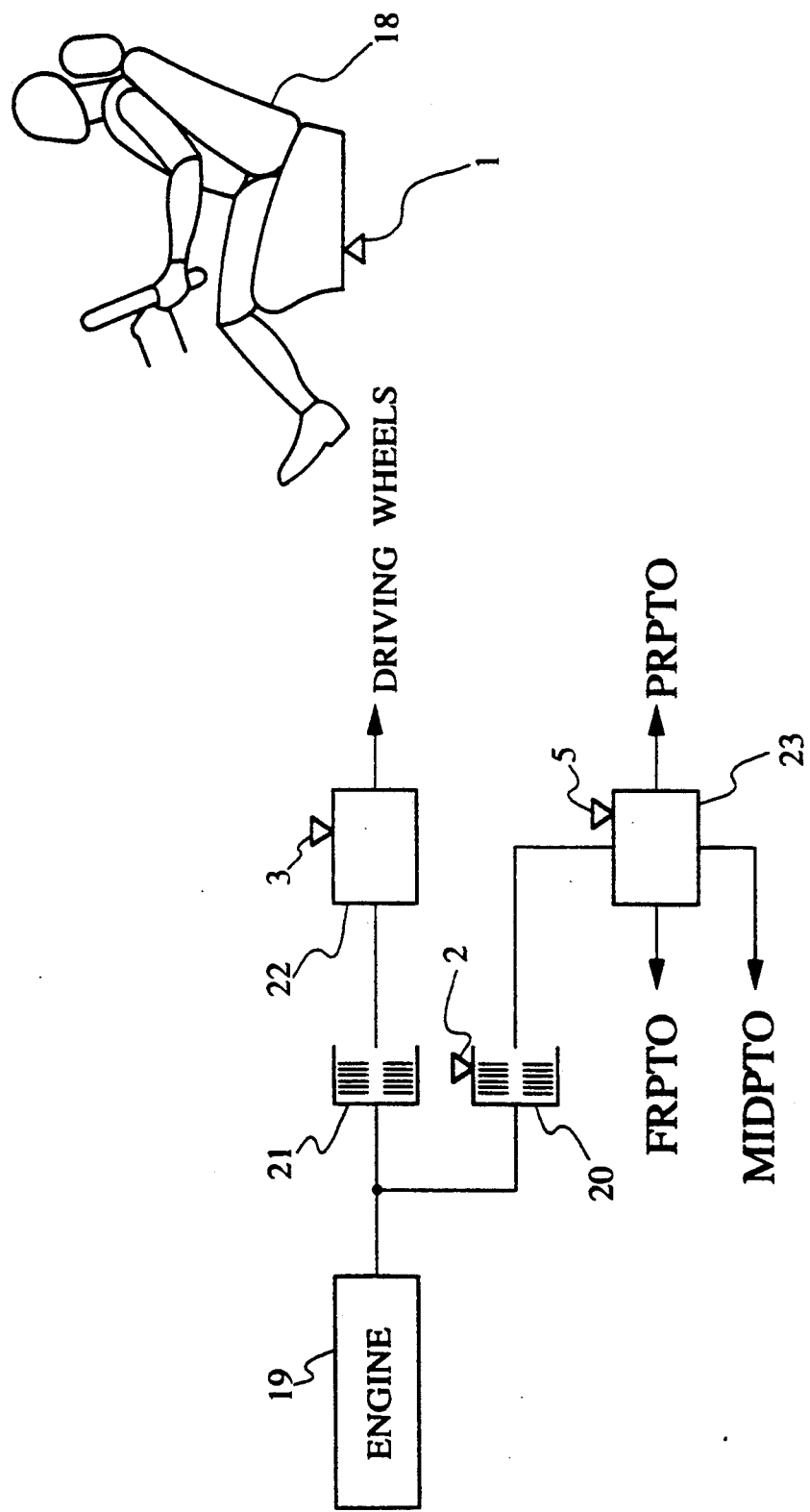
FIG. 2 is a schematic diagram showing an example of a driving system of the automotive working vehicle.
Figure 3:
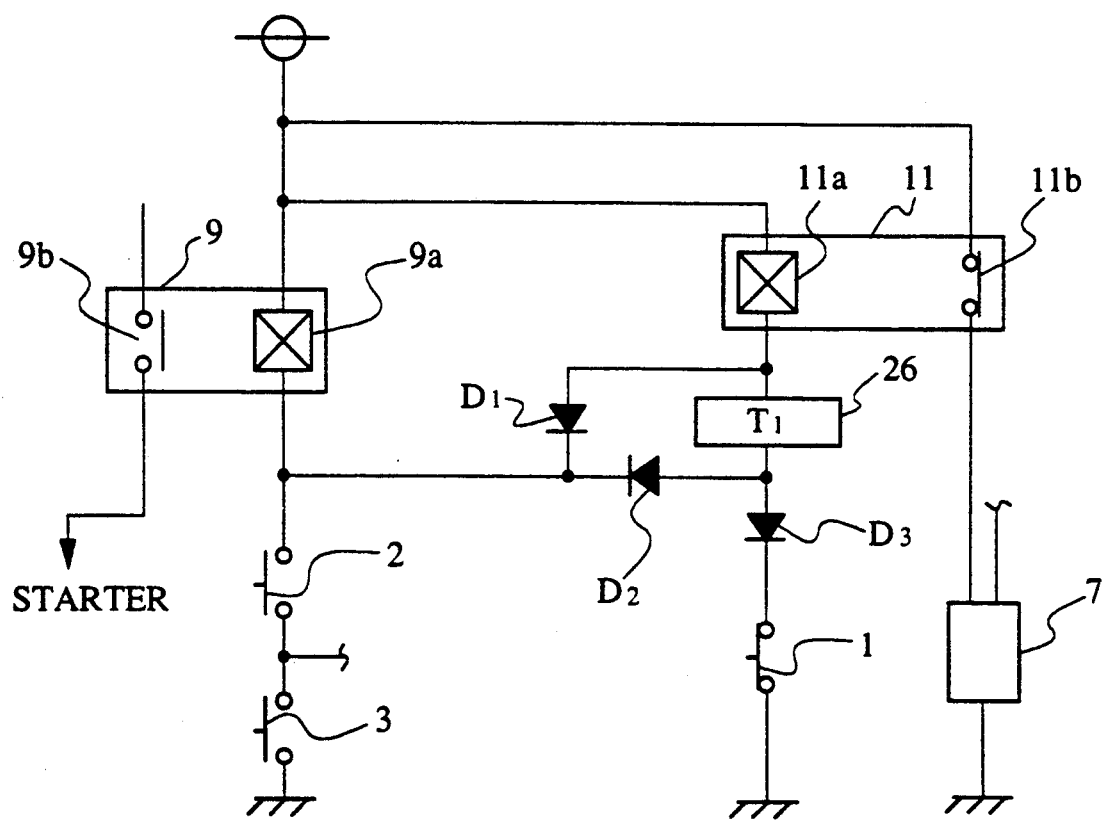
FIG. 3 is a circuit diagram showing part of the electric circuit of FIG. 1 useful in explaining control operation for a normal operation other than a stationary operation of the automotive working vehicle.

The seat switch 1, which is connected to a terminal 17k of the combination relay system 8, is arranged at the bottom of the driver's seat, as shown in FIG. 2 which schematically illustrates the driving system of the automotive working vehicle. The seat switch 1 is formed by an ON/OFF switch which is closed when the seat 18 is occupied and open when it is not occupied.

The PTO clutch switch 2 and the neutral switch 3 are connected to terminals 17h and 17i of the combination relay system 8, respectively, and arranged in the following manner: The PTO clutch switch 2 is arranged, as shown in FIG. 2, at a predetermined location of a control lever of the PTO clutch 20 to which the driving force is transmitted from the engine 19, and it is adapted to open when the PTO clutch 20 is engaged and close when the latter is disengaged. On the other hand, the neutral switch 3 is arranged at a neutral position of a shift lever of the transmission 22 to which the driving force is transmitted from the engine 19 via a clutch 21 for either effecting or cutting off the supply of the driving force to driving wheels, not shown, of the automotive working vehicle. The neutral switch 3 is adapted to close when the shift lever is shifted to the neutral position and open when it is shifted to another position other than the neutral position.

The parking brake switch 4 is formed by an ON/OFF switch which is changed over by operation of a parking lever, not shown. It is adapted to close when the operator operates the parking lever to lock the parking brake, and open when locking of the parking brake is cancelled.

Further, as shown in FIG. 2, the PTO selector switch 5 is arranged at a selector 23 for selectively transmitting to PTO shafts the driving force supplied via the PTO clutch 20. In the present embodiment, the PTO selector switch 5 is adapted to close only when the selector 23 selects the rear PTO shaft to be driven.

The parking brake switch 4 and the PTO selector switch 5 are inserted into one of power-feeding lines for feeding power to the system 8 via a combination switch 24.

The combination switch 24 has a terminal BATT, a terminal ST, and a terminal LO. The terminal BATT is connected to a power-feeding terminal 25 of a power source (battery), not shown. When the combination switch 24 is in an off position, the terminal BATT is not connected to either of the terminal ST and the terminal LO. On the other hand, when it is in a starting position, the terminal BATT is connected to both of the terminals ST and LO. Further, when it is in an on position, the terminal BATT is connected to the terminal LO.

The terminal ST of the combination switch 24 is connected to one end of normally-open contacts $9b$ of a relay circuit 9 via a terminal $17a$ of the combination relay system 8, and the other end of the normally-open contacts $9b$ is connected to a terminal $17g$ of the combination relay system 8. The aforementioned starter motor 6 is connected between the terminal $17g$ and ground (e.g. the body of the vehicle).

The terminal LO of the combination switch 24 is connected to one end of each of coils $9a$ to $11a$ of relay circuits 9 to 11 via a terminal $17b$ of the system 8. The other end of the coil $9a$ of the relay circuit 9 is connected to a terminal $17h$ of the system 8. The PTO clutch switch 2 and the neutral switch 3 are connected in series between the terminal $17h$ and ground. The other end of the coil $11a$ of the relay circuit 11 is connected to the anode of a diode $D_1$ and the anode of a diode $D_2$ via a timer $(T_1)$ 26. The cathodes of these diodes are connected to the terminal $17h$.

The junction between the timer $(T_1)$ and the anode of the diode $D_2$ is connected to the anode of a diode $D_3$, and the cathode of the diode $D_3$ is connected to a terminal $17k$ of the system 8. As mentioned hereinbefore, the seat switch 1 is connected between the terminal $17k$ and ground.

Further, the other end of the coil $10a$ of the relay circuit 10 is connected via a terminal $17i$ of the system 8 to the junction between the PTO clutch switch 2 and the neutral switch 3 connected in series.

The terminal LO of the combination switch 24 is connected to a terminal $17d$ of the system 8, and normally-open contacts $11b$ of the relay circuit 11 are connected between the terminal $17d$ and a terminal $17l$ of the system 8. The stop solenoid 7 is connected between the terminal $17l$ to which a terminal $7a$ thereof connected to a holding coil thereof, not shown, is connected and ground. A timer $(T_2)$ 27 is connected together with a terminal $17l'$ between the normally-open contacts $11b$ and a terminal $7b$ of the stop solenoid 7 connected to a starting coil thereof, not shown.

Further, the terminal LO of the combination switch 24 is connected to one end of the parking brake switch 4, and the other end of same is connected via a parking brake buzzer 28 and further via a terminal $17c$ of the system 8 to one end of normally-closed contacts $10b$ of the relay circuit 10. The other end of the normally-closed contacts $10b$ is grounded via a terminal $17j$ of the system 8. Further, the PTO selector switch 5 is connected between the other end of the parking brake switch 4 and a terminal $17e$ of the system 8.

The terminal $17e$ is connected to one end of normally-open contacts $12b$ of a relay circuit 12, and the other end of the normally-open contacts $12b$ is connected to one end of normally-closed contacts $13b$ of a relay circuit 13. The other end of the normally-closed contacts $13b$ in turn is connected to one end of normally-open contacts $14b$ of a relay circuit 14, with the other end of the normally-open contacts $14b$ being connected to one end of a coil $15a$ of a relay circuit 15. The other end of the coil $17a$ is connected to the terminal $17j$ and a terminal $17m$ of the system 8. Further, one ends of coils $12a$ and $13a$ of relay circuits 12 and 13 are connected to the terminal $17d$ of the system 8, and the other ends of the coils $12a$ and $13a$ are connected to the terminals $17i$ and $17k$.

Further, the junction between the normally-closed terminal $13b$ of the relay circuit 13 and the normally-open contacts $14b$ of the relay circuit 14 is connected via a terminal $17o$ of the system 8 to one end of the self-resetting type switch 29 for stationary operation having normally open contacts, and the other end of the switch 29 is connected to a terminal $17n$ of the system 8 and one end of a pilot lamp 30 for stationary operation. The other end of the pilot lamp 30 is connected to the terminal $17m$ of the system 8.

The relay circuits 14 and 15 forming the self-holding circuit 33 are connected to each other in the following manner:

The junction between the normally-open contacts $14b$ of the relay circuit 14 and the coil $15a$ of the relay circuit 15 is connected to the terminal $17n$ of the system 8 and the one end of a coil $14a$ of the relay circuit 14. The other end of the coil $14a$ is grounded via the terminal j.

One end of normally-open contacts $15b$ of the relay circuit 15 is connected to the terminal $17h$, and the other end of the normally-open contacts $15b$ is grounded via the terminal $17j$.

In addition, in the present embodiment, a relay circuit 16 is incorporated in the combination relay system 8 for controlling turning-on or off of a hazard lamp 31. A switch 32 is connected between a terminal 17 of the system 8 and the hazard lamp 31. When the switch 32 is closed, the supply of power via a terminal $17f$ and the relay circuit 16 to the hazard lamp from the power-feeding terminal 25 is controlled (i.e. effected or cut off), whereby the turning-on or off of the hazard lamp 31 is controlled.

Next, the operation of the operation control system having the above construction will be described.

First, let it be assumed that, just before the start of the engine of the vehicle, the shift lever of the transmission 22 is in neutral position and at the same time the PTO clutch 20 is disengaged, i.e. the neutral switch 3 is closed and the PTO clutch switch 2 is closed.

In this state, if the combination switch 24 is turned from the off position to the starting position to start the engine 19, the terminal BATT is connected to the terminals ST and LO, so that the coil $9a$ of the relay circuit 9 is energized to close the normally-open contacts $9b$. As a result, power is supplied to the starter motor 6 to start same.

At the same time, the coil $11a$ of the relay circuit 11 is also energized to close its normally-open contacts 11b, and hence power is supplied to the starting coil terminal 7b of the stop solenoid 7 via the timer (T₂) and to the holding coil terminal 7a of same, so that the stop solenoid 7 is energized to open the fuel passage to supply fuel to the engine, thus starting the engine.

Next, the normal operation after the start of the engine of the automotive working vehicle will be described.

During the normal operation, the driver's seat is occupied, so that the seat switch 1 is closed, and if the vehicle is moving (travelling), the neutral switch 3 is open. Further, if the lawnmower etc. is being driven via a PTO shaft (FRPTO, MIDPTO) by the engine 19, the PTO clutch switch 2 is also open.

In such a state of operation, if the operator leaves the driver's seat for some reason, the seat switch 1 opens. When the seat switch 1 thus opens, if the PTO clutch switch 2 is open or the neutral switch 3 is open, the coil 11a of the relay circuit 11 becomes deenergized when a predetermined time period (e.g. 0.5 seconds), which is counted by the timer (T1) 26, has elapsed after it is detected that the operator has left the driver's seat. Thus, the normally-open contacts 11b, which was closed, is reset to its open position. As a result, the power supply to the stop solenoid 7 is cut off to turn off the stop solenoid 7, which causes the fuel supply to the engine 19 to be cut off to stop the engine 19 (the first function mentioned above).

Figure 4:
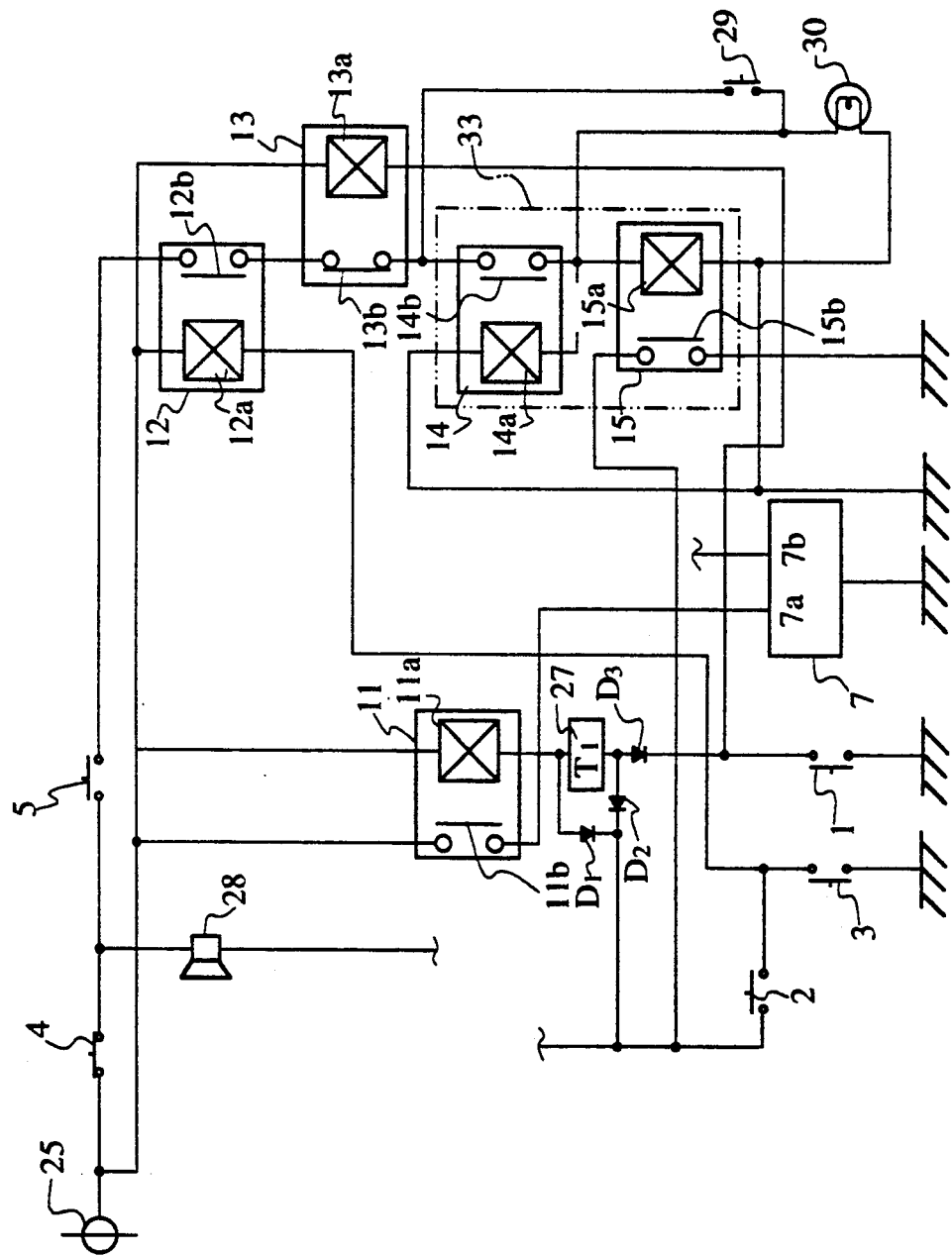
FIG. 4 is a circuit diagram similar to that of FIG. 3 useful in explaining control operation for a stationary operation of the automotive working vehicle.

Next, a stationary operation will be described, in which while the automotive working vehicle is in unmanned state, the rear PTO shaft is driven for rotation by the engine 19 to be used as a drive source e.g. for a water pump (see FIG. 4).

In this stationary operation, the operator sequentially carries out the following steps (1) to (6):

(1) The shift lever of the transmission 22 is shifted to the neutral position to thereby put the vehicle into a standing state.

(2) The parking brake is locked.

(3) To use the rear PTO shaft as the drive source for the stationary operation, the PTO selector 23 is changed over to the rear PTO shaft. On this occasion, since the PTO clutch 20 is disengaged, the driving force of the engine 19 is not transmitted to the rear PTO shaft.

(4) The operator leaves the driver's seat. On this occasion, as mentioned above, the shift lever is in its neutral position and the PTO clutch 20 is disengaged, so that the neutral switch 3 and the PTO clutch switch 2 are both closed. Therefore, even if the seat switch 1 opens due to leaving of the operator from the driver's seat, power continues to be supplied to the stop solenoid 7, thus holding the engine 19 in operation (the second function mentioned hereinbefore).

(5) The operator manually turns on the self-resetting switch 29 for stationary operation, whereby the self-holding circuit 33 is set.

The above operations (1) to (4) cause the neutral switch 3, the parking brake switch 4, and the PTO selector switch 5 to close, and the seat switch 1 to open. Further, closure of the neutral switch 3 causes the coil 12a of the relay circuit 12 to be energized to close the normally-open contacts 12b. As a result, an electric current passage is formed, which extends in the order of the power-feeding terminal 25—terminal LO—parking brake switch 4—PTO selector switch 5—normally-open contacts 12b of relay circuit 12—normally-closed contacts 13b of relay circuit 13 (FIG. 4). Then, the operation (5) causes the coil 14a of the relay circuit 14 to be energized to close the normally-open contacts 14b and at the same time the coil 15a of the relay circuit 15 to be energized to close the normally-open contacts 15b, whereby the self-holding circuit 33 is set. In this set state of the self holding circuit 33, the closure of the normally-open contacts 15b allows to secure another circuit for feeding power to the coil 11a of the relay circuit 11. Therefore, even if the PTO clutch 20 is engaged to open the PTO clutch switch 2, the coil 11a continues to be energized to keep the normally-open contacts 11b closed, so that the power supply to the stop solenoid 7 is maintained to hold the engine 19 in operation.

(6) After the operation (5), the water pump is connected to the rear PTO shaft, and thereafter the PTO clutch 20 is engaged.

Thus, the driving force of the engine 19 is transmitted via the PTO clutch 20 to the rear PTO shaft to drive the water pump to thereby start the stationary operation. During the stationary operation, if a person other than the operator unlocks the parking brake, for example, the parking brake switch 4 opens, whereby the power supply to the relay circuit 14 of the self-holding circuit 33 is cut off. This puts the self-holding circuit 33 into a reset state in which the normally-open contacts 14b and 15b of the relay circuits 14 and 15 are open. As a result, the coil 11a of the relay circuit 11 becomes deenergized to restore the normally-open contacts 11b to their open position, and hence the power supply to the stop solenoid 7 is cut off to stop the engine 19.

On this occasion, let it be assumed that the person restores the parking brake to the former position hurriedly and confusedly, i.e. to the locked position and carries out the starting operation, in order to restart the engine 19. Although a passage for electric current is then formed from the power-feeding terminal 25 to the normally-closed contacts 13b of the relay circuit 13, the self-holding circuit 33 is in the reset state, preventing the coil 11a of the relay circuit 11 from being energized, so that power is not supplied to the stop solenoid 7. Therefore, the engine 19 cannot be restarted. At this time, if the self-resetting switch 29 is turned on again with the intention of resuming the stationary operation, the self-holding circuit 33 is set again to cause the coil 11a of the relay circuit 11 to be energized, so that the normally-open contacts 11b of same are closed to supply power to the stop solenoid 7. Therefore, if the starting operation is carried out in this state, the engine 19 is restarted so that the driving force is again transmitted to the rear PTO shaft to resume the stationary operation.

Thus, in the case where during the stationary operation, an operation other than one permitted under the conditions for carrying out the stationary operation, e.g. unlocking of the parking brake, is done to thereby stop the engine, which causes the stationary operation to stop, it is possible to reliably resume the stopped stationary operation.

Further, since the self-resetting switch 29 is used as the switch for stationary operation, it is not necessary to arrange the switch 29 at such a location, e.g. under the seat 18, as makes it difficult to operate the switch 29, but instead, it is possible to arrange the switch 29 at a location, e.g. on an instrument panel, which allows the switch 29 to be easily accessed. Moreover, the switch 29, which is a self-resetting type, is impossible to inadvertently fail to reset.

Although the above described example deals with unlocking of the parking brake as an operation other than one permitted under the conditions for carrying out a stationary operation, this is not limitative, but also in a case where another operation, such as shifting of the shift lever from the neutral position to another position or selection of a PTO shaft other than the rear PTO shaft, is performed, it is possible to reliably resume the stationary operation. More specifically, in a case where the shift lever is shifted to a position other than the neutral position, the neutral switch 3 opens, so that power ceases to be supplied to the coil 12a of the relay circuit 12 to cause same to be deenergized to open the normally-open contacts 12b. As a result, the power supply to the relay circuit 14 of the self-holding circuit 33 is cut off to reset the circuit 33. Further, in a case where a PTO shaft other than the rear PTO shaft is selected, the PTO selector switch 5 opens, and hence, similarly, the power supply to the relay circuit 14 of the self-holding circuit 33 is cut off to reset the circuit 33. Therefore, in both the cases as well, the engine 19 cannot be restarted to resume the stationary operation unless the self-holding circuit 33 is set again by turning on the self-resetting switch 29.

Further, if the driver's seat becomes occupied during stationary operation, the seat switch arranged under the driver's seat is closed to form a passage for supplying power to the relay circuit 13, so that the coil 13a of the relay circuit 13 is energized to open the normally-closed contacts 13b, which in turn cuts off the power supply to the coil 14a of the relay circuit 14 to restore the normally-open contacts 14b to their original open position, thus resetting the self-holding circuit 33. However, in this state where the driver's seat is occupied, the one end of the coil 11a of the relay circuit 11 is connected to the power-feeding terminal 25, while the other end of the coil 11a is grounded via the timer ($T_1$) 26, diode $D_3$, and seat switch 1, so that the coil 11a continues to be energized. Therefore, the normally-open contacts 11b of the relay circuit 11 are held in the closed position, which allows the power supply to the stop solenoid 7 to be continued. As a result, the engine continues to be in operation. If, in this state, the operator leaves the driver's seat, the engine automatically stops, as already described hereinbefore.

In addition, if the shift lever of the transmission 22 is shifted to a position other than the neutral position, i.e. if the neutral switch 3 is closed, in the state where the parking brake is locked, i.e. the parking brake switch is closed, the coil 10a of the relay circuit 10 becomes deenergized to close the normally-closed contacts 11b, so that power is supplied to the buzzer 28 for raising an alarm.

In the above described embodiment, the circuit of the operation control system employs relay circuits. However, it may employ logic circuits.

Figure 5:
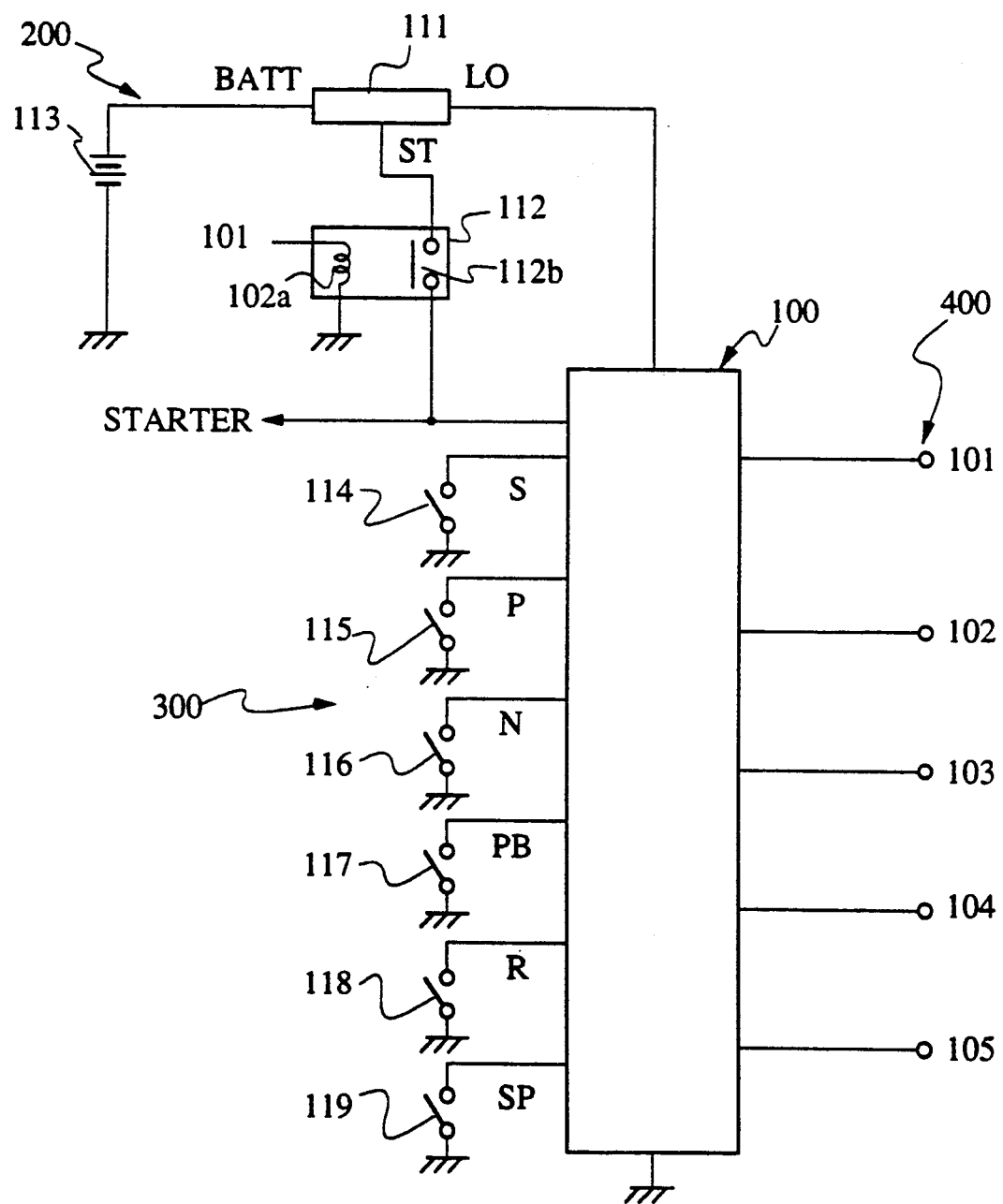
FIG. 5 is a circuit diagram showing an operation control system for an automotive working vehicle according to another embodiment of the invention.

FIG. 5 shows another embodiment in which such logic circuits are used. In the figure, the circuit of the operation control system comprises a control unit 100 including logic circuits shown in FIG. 6, a power supply unit 200, an input circuit 300, and an output circuit 400. The power supply unit 200 is composed of a combination switch 111, a start relay 112, and a power source 113. Terminals LO, ST, and BATT of the combination switch 111 are connected to the control unit 100, contacts 112b of the start relay 112, and the power source 113, respectively. Further, seven input signals are supplied via the input circuit 300 to the control unit 100.

More specifically, a signal STD is supplied from the start relay 112, which is indicative of whether the combination switch 111 is in an ST terminal position (position for rotating the starter). A signal S is supplied from a seat switch 114, which indicates whether or not the driver's seat is occupied. The seat switch 114 is closed when the driver's seat is occupied. A signal P is supplied from a PTO clutch switch 115, which indicates whether the PTO clutch 20 is engaged or disengaged. The PTO clutch switch 115 is closed when the PTO clutch 20 is disengaged. A signal N is supplied from a neutral switch 116, which indicates whether the transmission 22 is in neutral position. The neutral switch 116 is closed when the transmission 22 is in neutral position. A signal PB is supplied from a parking brake switch 117, which indicates whether or not the parking brake is locked. The parking brake switch 117 is closed when the parking brake is locked.

A signal R is supplied from a PTO selector switch 118, which indicates whether or not the rear PTO shaft alone of the PTO shafts is rotating. The PTO selector switch 118 is closed when the rear PTO shaft alone is rotating.

A signal SP is supplied from a self-resetting switch 119 for setting the self-holding circuit. The self-resetting switch 119 is manually closed by the operator when performing a stationary operation.

Further, the output circuit 400 generates five outputs, which function as follows:

An output 101 energizes a coil 112a of the start relay 112, whereby the contacts 112b are closed. Therefore, if the terminals ST and BATT of the combination switch 111 are connected to each other, power is supplied to the starter, enabling the engine to be started.

Outputs 102 and 103 drive the stop solenoid 7 for closing and opening the fuel passage to thereby allow the diesel engine to be operated. The stop solenoid 7 is a double winding type, and the output 102 is for a holding coil thereof the output 103 for a starting coil thereof.

An output 104 drives the pilot lamp 30 for stationary operation, and an output 105 drives the buzzer 28 on condition that the parking brake is locked.

Figure 6:
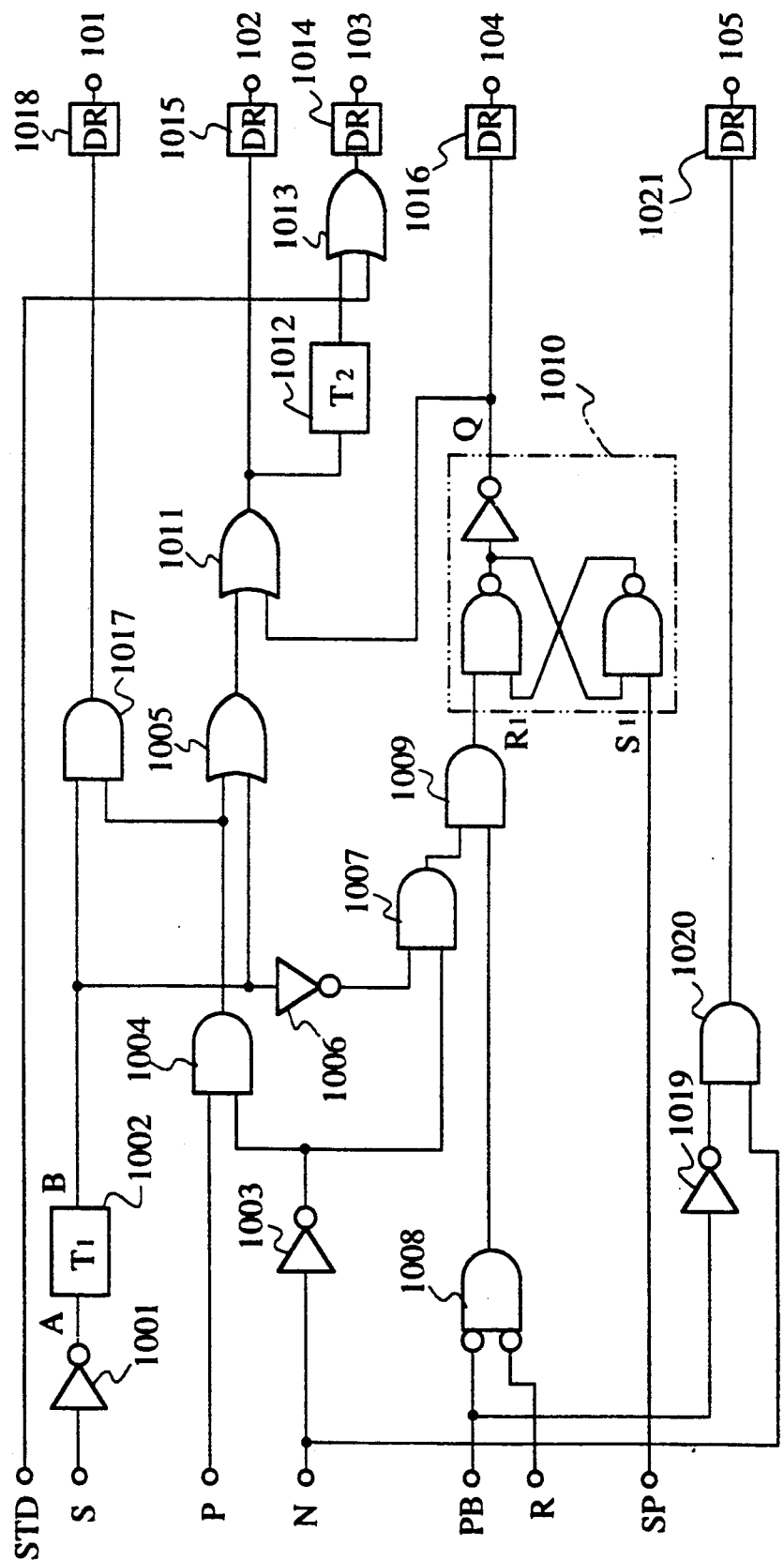
FIG. 6 is a circuit diagram showing the circuit construction of a control unit appearing in FIG. 5.

The operation of the control unit 100 will now be described with reference to FIG. 6.

First, the operation of the control unit 100 performed upon establishment of the aforementioned four conditions (1)–(4) for stationary operation will be described.

When the conditions (1)–(4) are satisfied, the seat switch 114 is off (open), and therefore the signal S assumes a high level, and is supplied as a binary output of 1 to a NOT gate 1001. The NOT gate 1001 inverts the input to a low level which is supplied as a binary output of 0 therefrom to a timer ($T_1$) 1002.

As shown in a timing chart (7-1) of FIG. 7, the timer ($T_1$) 1002 is constructed such that an output signal (B) rises upon rising of an input signal (A), and the output signal (B) falls after a predetermined time period t, e.g. 0.3+0.2 or −0 seconds has elapsed after the input signal (A) fell. Therefore, in the present case, responsive to the input value of 0, the timer ($T_1$) 1002 outputs a value of 0.

In the meanwhile, since the neutral switch 116 is then on, the signal N is supplied as a binary output of 0 to a NOT gate 1003. An output value of 1 from the NOT gate 1003 is supplied to one input terminal of an AND gate 1004. On this occasion, since the PTO clutch switch 115 is then on, the signal P is supplied as a binary output of 0 to the other input terminal of the AND gate 1004. Therefore, the AND gate 1004 outputs a value of 0. Responsive to low level inputs from the circuits 1002, 1004, an OR gate 1005 outputs a value of 0. At the same time, responsive to a value of 1 from the NOT gate 1003 and a value of 1 from a NOT gate 1006, an AND gate 1007 outputs a a value 1.

Further, since the parking brake switch 117 and the PTO selector switch 118 are then on, the signals PB and R are supplied as binary outputs of 0 to a NOR gate 1008, which outputs a value of 1.

Responsive to the two high level inputs from the gates 1007, 1008, an AND gate 1009 outputs a value of 1 to a resetting terminal $R_1$ of a self-holding circuit (R-S flip flop circuit) 1010.

In this state, the operator manually turns on the self-resetting switch 119 for stationary operation, whereby a one shot signal SP having a value of 0 is generated and supplied to a setting terminal $S_1$ of the self-holding circuit 1010.

As a result, as shown in a timing chart (7-2) of FIG. 7, the output from an output terminal Q of the self-holding circuit 1010 is held high, so long as the high level input from the gate 1009 is supplied to the resetting terminal $R_1$.

The output of 1 from the self-holding circuit 1010 is supplied through an OR gate 1011 to an input terminal C of a timer ($T_2$) 1012 and a drive circuit (DR) 1015. As shown in a timing chart (7-3) of FIG. 7, responsive to the input of 1 supplied to the input terminal C, the timer ($T_2$) 1012 outputs from an output terminal D thereof a signal having a duration t of 1 or more seconds, which is supplied through an OR gate 1013 to a drive circuit (DR) 1014, which in turn outputs an output signal 103 to the starting coil of the stop solenoid 7. In the meanwhile, the drive circuit (DR) 1015 outputs an output signal 102 to the holding circuit of the stop solenoid 7.

The output of 1 from the output terminal Q of the self-holding circuit 1010 is also supplied to a drive circuit (DR) 1016, so that simultaneously when the stop solenoid 7 starts to be driven, an output signal 104 from the drive circuit (DR) 1016 is supplied to the pilot lamp 30.

During the stationary operation, when an operation permitted under the conditions for the stationary operation is carried out to nullify one of the conditions, the engine automatically stops, and it is restarted in the same manner as in the aforedescribed first embodiment using the relay circuits.

When the engine is started, signals of 1 are supplied to both input terminals of the AND gate 1017, which in turn supplies an output of 1 to a drive circuit (DR) 1018. The resulting output signal 101 from the drive circuit (DR) 1018 energizes the coil 112a of the start relay 112 (see FIG. 5). This causes the normally-open contacts 112b of the start relay 112 to lose, so that the signal STD having a value of 1 and thereby indicating that the combination switch 111 is in the ST terminal position, is supplied to the OR gate 1013. The output of 1 from the OR gate 1013 is supplied to the drive circuit (DR) 1014, which in turn supplies an output signal 103 to the starting coil of the stop solenoid 7.

Further, when the parking brake is locked, the signal PB having a value of 0 is supplied therefrom to the input terminal of the NOT gate 1019.

If the shift lever of the transmission 22 is shifted to a position other than the neutral position, the signal N having a value of 1 is supplied to one input terminal of the AND gate 1020, and an output signal having a value of 1 from the NOT gate 1019 is supplied to the other input terminal of the AND gate 1020. Accordingly, an output signal having a value of 1 from the AND gate 1020 is supplied to the drive circuit (DR) 1021, which in turn supplies an output signal 105 to the buzzer 28.

Thus, by constructing the control circuit using logic circuits, the operation control system can be compact in size and reduced in weight. Further, since no mechanical contacts are used in the control circuit, the operation thereof can be made still more reliable.

What is claimed is:

1. In an operation control system for an automotive working vehicle having an engine, a transmission, a plurality of PTO shafts including a PTO shaft for stationary operation, a PTO selector for selecting one of said plurality of PTO shafts, a PTO clutch which transmits, when it is engaged, a driving force from said engine to one of said plurality of PTO shafts selected by said PTO selector, and a driver's seat, said operation control system having first detecting means for detecting whether or not said driver's seat is occupied, second detecting means for detecting whether or not said transmission is in a neutral position, third detecting means for detecting whether or not said PTO clutch is engaged, fourth detecting means for detecting whether or not said PTO shaft for stationary operation has been selected out of said plurality of PTO shafts by said PTO selector, and engine operation-holding means for holding said engine in operation, when said first detecting means detects that said driver's seat becomes unoccupied at least under conditions that said third detecting means has detected that said PTO clutch is disengaged and said second detecting means has detected that said transmission is in said neutral position, the improvement comprising:

a self-resetting switch as a switch for stationary operation; and a self-holding circuit which is set, when said self-resetting switch is operated in a state where a first condition that said first detecting means has detected that said driver's seat is unoccupied, a second condition that said second detecting means has detected that said transmission is in said neutral position, and a third condition that said fourth detecting means has detected that said PTO shaft for stationary operation has been selected out of said plurality of PTO shafts by said PTO selector, are satisfied, to a predetermined set state which enables said engine to operate even when said third detecting means detects that said PTO clutch is engaged in said state where said first to third conditions are satisfied, said predetermined set state of said self-holding circuit being cancelled when at least one of said first to third conditions ceases to be satisfied.

2. In an operation control system for an automotive working vehicle having an engine, a transmission, a plurality of PTO shafts including a PTO shaft for stationary operation, a PTO selector for selecting one of said plurality of PTO shafts, a PTO clutch which transmits, when it is engaged, a driving force from said engine to one of said plurality of PTO shafts selected by said PTO selector, a driver's seat, and a parking brake, said operation control system having first detecting means for detecting whether or not said driver's seat is occupied, second detecting means for detecting whether or not said transmission is in a neutral position, third detecting means for detecting whether or not said PTO clutch is engaged, fourth detecting means for detecting whether or not said PTO shaft for stationary operation has been selected out of said plurality of PTO shafts by said PTO selector, fifth detecting means for detecting whether or not said parking brake is locked, and engine operation-holding means for holding said engine in operation, when said first detecting means detects that said driver's seat becomes unoccupied at least under conditions that said third detecting means has detected that said PTO clutch is disengaged and said second detecting means has detected that said transmission is in said neutral position, the improvement comprising:
- a self-resetting switch as a switch for stationary operation; and
- a self-holding circuit which is set, when said self-resetting switch is operated in a state where a first condition that said first detecting means has detected that said driver's seat is unoccupied, a second condition that said second detecting means has detected that said transmission is in said neutral position, a third condition that said fourth detecting means has detected that said PTO shaft for stationary operation has been selected out of said plurality of PTO shafts by said PTO selector, and a fourth condition that said fifth detecting means has detected that said parking brake is locked, are satisfied, to a predetermined set state which enables said engine to operate even when said third detecting means detects that said PTO clutch is engaged in said state where said first to fourth conditions are satisfied, said predetermined set state of said self-holding circuit being cancelled when at least one of said first to fourth conditions ceases to be satisfied.

* * * * *